United States Patent
Fultz et al.

(10) Patent No.: US 7,190,277 B2
(45) Date of Patent: Mar. 13, 2007

(54) CAPACITIVE OCCUPANT PRESENCE DETECTION APPARATUS FOR A VEHICLE SEAT

(75) Inventors: William W. Fultz, Carmel, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 221 days.

(21) Appl. No.: 11/044,802

(22) Filed: Jan. 27, 2005

(65) Prior Publication Data

US 2005/0134442 A1 Jun. 23, 2005

Related U.S. Application Data

(63) Continuation-in-part of application No. 10/643,044, filed on Aug. 18, 2003, now Pat. No. 6,927,678.

(51) Int. Cl.
*G08B 21/00* (2006.01)
*B60R 22/00* (2006.01)

(52) U.S. Cl. .......................................... 340/667; 701/45

(58) Field of Classification Search ................ 340/438, 340/425.5, 500–502, 450, 532, 677; 177/45; 701/45; 346/40
See application file for complete search history.

(56) References Cited

U.S. PATENT DOCUMENTS

| 5,987,370 A | 11/1999 | Murphy et al. ............... 701/45 |
| 6,101,436 A | 8/2000 | Fortune et al. ............... 701/45 |
| 6,246,936 B1 | 6/2001 | Murphy et al. ............... 701/45 |
| 6,356,194 B1 * | 3/2002 | Fukui et al. ................. 340/561 |
| 6,490,936 B1 | 12/2002 | Fortune et al. ............... 73/714 |
| 6,918,612 B2 * | 7/2005 | Smith et al. ................. 280/735 |
| 2003/0005775 A1 * | 1/2003 | Washeleski et al. .......... 73/780 |
| 2003/0009273 A1 | 1/2003 | Stanley et al. ............... 701/45 |

OTHER PUBLICATIONS

EP search report dated Apr. 13, 2006.

* cited by examiner

*Primary Examiner*—Daniel Wu
*Assistant Examiner*—Jennifer Mehmood
(74) *Attorney, Agent, or Firm*—Jimmy L. Funke

(57) ABSTRACT

An occupant presence detection apparatus detects a change in capacitance between upper and lower conductor plates disposed on or near upper and lower surfaces of a fluid-filled elastomeric seat bladder, and a semi-rigid mat disposed between the seat cushion and the bladder includes a peripheral cavity at least partially surrounding the upper conductor plate. When occupant weight applied to the seat cushion is transmitted to the bladder, it distends into the peripheral cavity of the semi-rigid mat, producing a significant reduction in the separation between the upper and lower conductor plates, and a corresponding significant increase in the detected capacitance. Once the bladder has fully distended into the cavity, additional loading due to increased occupant weight produces only a minimal further increase of the measured capacitance.

6 Claims, 2 Drawing Sheets

CAPACITIVE OCCUPANT PRESENCE DETECTION APPARATUS FOR A VEHICLE SEAT

RELATED APPLICATIONS

This application is a continuation-in-part of U.S. patent application Ser. No. 10/643,044 (now U.S. Pat. No. 6,927,678), filed Aug. 18, 2003.

TECHNICAL FIELD

The present invention is directed to a capacitive sensor including a fluid-filled bladder for detecting occupant presence on a vehicle seat.

BACKGROUND OF THE INVENTION

Occupant presence detection is frequently used in connection with air bags and other pyrotechnically deployed restraints as a means of determining if the restraints should be deployed in the event of sufficiently severe crash. Although various ways of detecting occupant presence have been devised, perhaps the most simple and cost-effective way involves installing a fluid-filled bladder in or under the bottom foam cushion of the vehicle seat and measuring the fluid pressure in the bladder with a pressure sensor. Exemplary systems of this type are disclosed, for example, in the U.S. Pat. Nos. 5,987,370 and 6,246,936 to Murphy et al., and the U.S. Pat. Nos. 6,101,436 and 6,490,936 to Fortune et al., all of which are assigned to Delphi Technologies, Inc., and incorporated herein by reference. Alternatively, the cost of the pressure sensor can be avoided by providing conductor plates on or near the upper and lower surfaces of the bladder, and detecting changes in capacitance between the plates when the thickness of the bladder changes due to the presence of occupant weight. However, the changes in capacitance tend to be relatively small, and a significant calibration effort may be required even in applications where the system merely has to detect occupant presence (as opposed to occupant weight, or weight distribution). Accordingly, what is needed is a cost-effective and easily calibrated capacitive occupant presence sensor.

SUMMARY OF THE INVENTION

The present invention is directed to an improved occupant presence detection apparatus that detects a change in capacitance between upper and lower conductor films disposed on or near upper and lower surfaces of a fluid-filled elastomeric seat bladder, where a semi-rigid mat disposed between the seat cushion and the bladder includes a peripheral cavity at least partially surrounding the upper conductor film. When occupant weight applied to the seat cushion is transmitted to the bladder, the bladder distends into the peripheral cavity of the semi-rigid mat, producing a significant reduction in separation between the upper and lower conductor films, and a corresponding significant increase of the measured capacitance. Once the bladder has fully distended into the cavity, additional loading due to increased occupant weight produces only minimal increase of the detected capacitance. Advantageously, the semi-rigid mat may serve as a substrate for the upper conductive film and a capacitance measurement circuit.

BRIEF DESCRIPTION OF THE DRAWINGS

FIG. 1A depicts the seat in an unoccupied condition, and FIG. 1B depicts the seat in an occupied condition.

DESCRIPTION OF THE PREFERRED EMBODIMENT

Figure 1A:
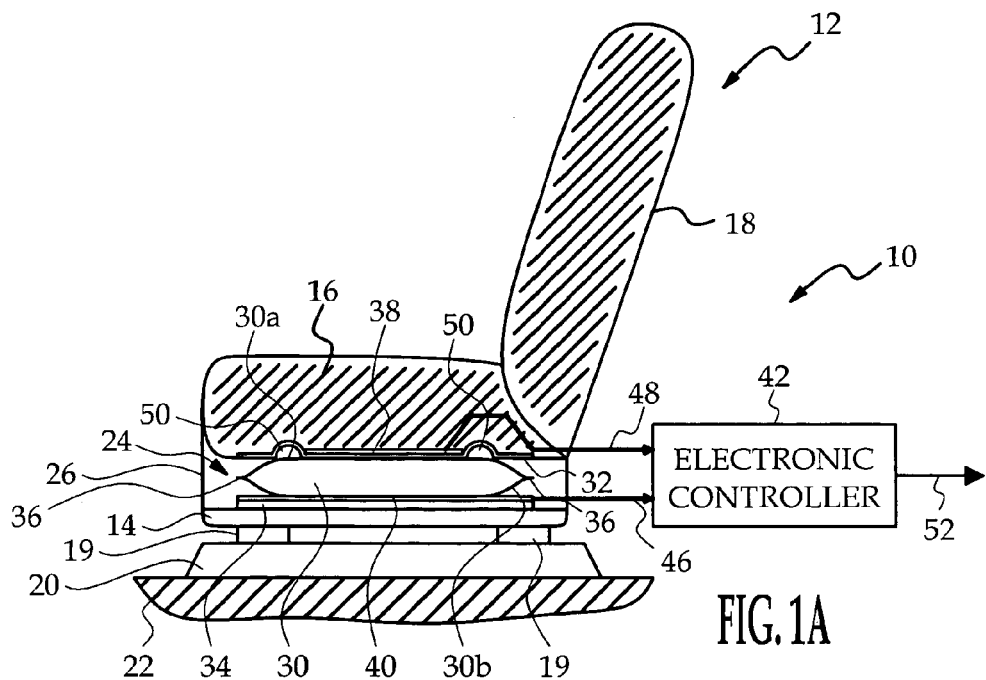
FIGS. 1A and 1B diagrammatically depict a vehicle seat equipped with a capacitive occupant presence detection apparatus according to this invention, including a microprocessor-based electronic controller.
Figure 1B:
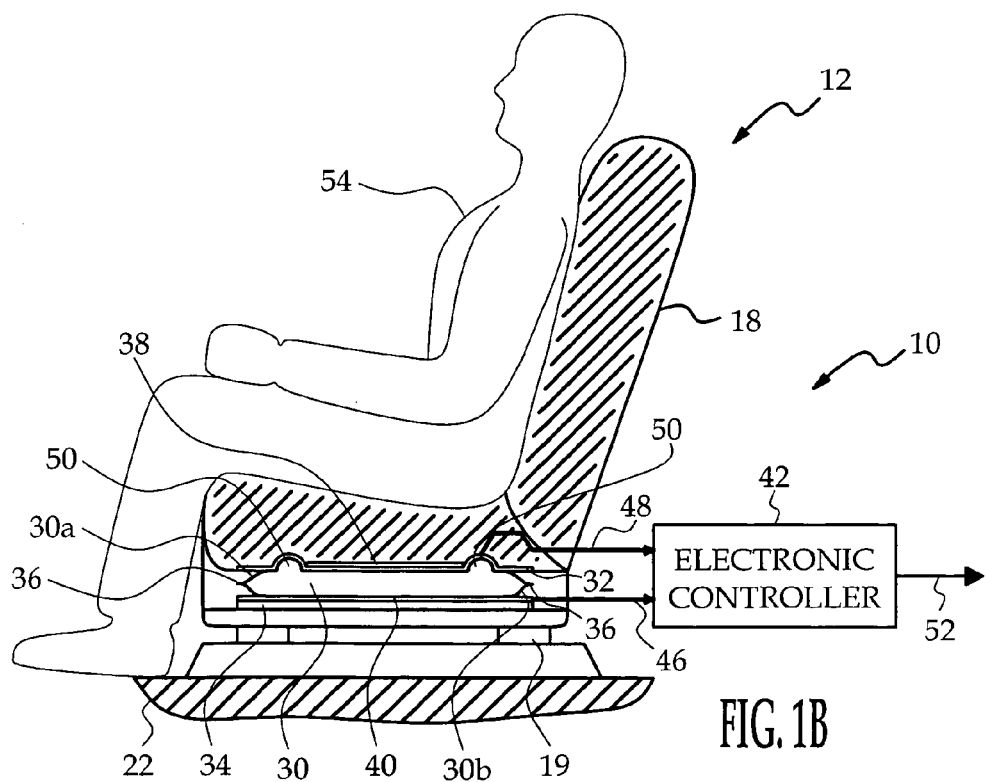

Referring to the drawings, and particularly to FIGS. 1A and 1B, the reference numeral 10 generally designates an occupant presence detection apparatus for a vehicle seat 12. The seat 12 includes a rigid frame and spring suspension 14, a bottom foam cushion 16 and a back foam cushion 18. A set of posts 19 integral to the frame 14 attach the seat 12 to pair of tracks 20 (only one of which is shown), which in turn, are secured to the vehicle floor 22. A bladder assembly 24 (enlarged in the vertical direction for purposes of illustration) is sandwiched between the bottom cushion 16 and the suspension elements of frame 14 for the purpose of detecting the presence of a seat occupant, as explained below. Finally, a cover 26 envelopes the cushion 16, bladder assembly 24 and frame 14.

The bladder assembly 24 comprises fluid-filled elastomeric bladder 30, a semi-rigid upper mat 32 disposed between the bladder 30 and the bottom cushion 16, and a lower mat 34 disposed between the bladder 30 and the seat frame 14. The bladder 30 comprises upper and lower elastomeric sheets 30a, 30b joined at their periphery by a continuous weld 36, and is filled with a fluid such as silicone which is non-corrosive and not subject to freezing or breakdown at extreme ambient temperatures.

The bladder assembly 24 additionally includes an upper conductor film or plate 38 disposed on or adjacent the upper elastomeric sheet 30a, and a lower conductor film or plate 40 disposed on or adjacent the lower elastomeric sheet 30b. In the illustrated embodiment, the upper conductor plate 38 is formed on the upper mat 32, and the lower conductor plate 40 is formed on the lower mat 34. The conductor plates 38 and 40 are electrically coupled to a microprocessor-based electronic controller 42 via lines 46 and 48, and a capacitance measurement circuit disposed on the upper mat 32 or within electronic controller 42 measures the electrical capacitance between the conductor plates 38 and 40. In general, the application of occupant weight to the cushion 16 loads the bladder 30, producing a reduction in its thickness; the distance between the conductor plates 38 and 40 is correspondingly reduced, reducing the measured capacitance. The capacitance measurement circuit may be cost-effectively implemented with an application specific integrated circuit (ASIC) if desired. In a typical implementation, the circuit grounds the lower conductor plate 40, and couples an AC voltage to the upper conductor plate 38 via a resistor; in this case, the capacitance of the sensor can be determined from the capacitor voltage. Other capacitance measurement techniques can alternatively be employed.

Upper and lower mats of some sort are ordinarily included in a seat bladder assembly in order to protect the bladder 30 from puncture damage, improve occupant weight distribution, and provide a uniform reaction surface for the bladder 30, as disclosed for example in the aforementioned U.S. Pat. No. 6,490,936 to Fortune et al. According to this invention, however, the upper mat 32 has a novel shape that interacts with the bladder in a way that significantly enhances the capacitive response of the apparatus 10 for occupant presence detection. In particular, the upper mat 32 includes a peripheral recess or cavity 50 at least partially surrounding the upper conductor plate 38. The upper mat 32 may have sufficient rigidity to maintain its shape when occupant weight is applied to the cushion 16; for example, the mat 32 may be formed of polyurethane having a thickness of approximately 1 mm. Additionally or alternatively, the bottom of cushion 16 may be molded to conform to the cavity 50. In any event, the weight of an occupant 54 sitting on the cushion 16 is transmitted to bladder 30, causing bladder 30 to distend into the peripheral cavity 50, as illustrated in FIG. 1B. This produces a significant reduction in the separation between upper and lower conductor plates 38 and 40, and a corresponding significant increase of the measured capacitance. Once the bladder 30 has fully distended into the cavity 50, additional loading due to increased occupant weight produces only minimal increase of the measured capacitance. When the occupant weight is removed from the cushion 16, the bladder 30 returns to the unloaded state depicted in FIG. 1A.

Figure 2:
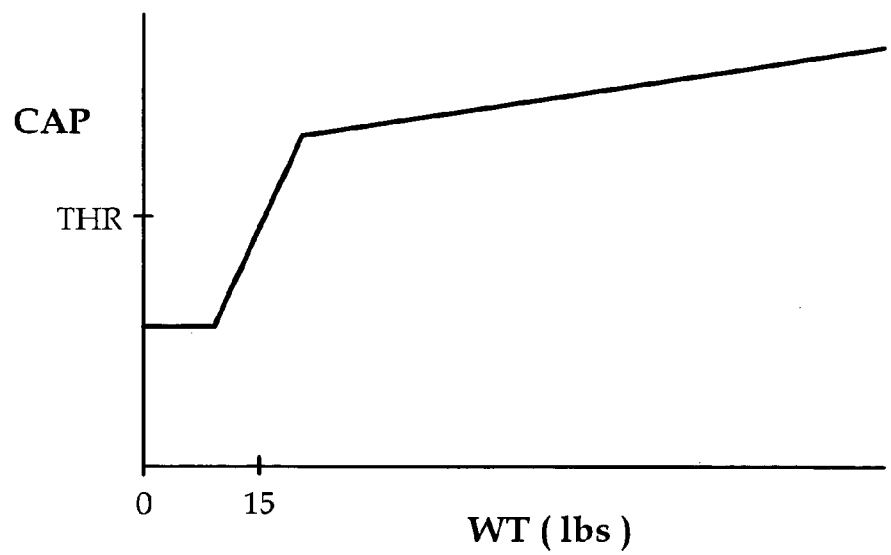
FIG. 2 graphically depicts a measured capacitance of the apparatus of FIGS. 1A and 1B as a function of occupant weight applied to the seat.

The relation between measured capacitance (CAP) and applied occupant weight (WT) is graphically depicted in FIG. 2. The measured capacitance essentially has two states: an unloaded (empty seat) state in which the capacitance is relatively low, and a loaded (occupant present) state in which the capacitance is relatively high. A threshold THR may be set to a value intermediate the high and low capacitance levels as shown to easily distinguish between the unloaded and loaded states. The threshold THR in illustrated embodiment is calibrated to correspond to an applied occupant weight of 15 lbs., but it will be appreciated that the apparatus may be calibrated to suit the requirements of different applications. Also, in applications where the cover 26 is stretched very tightly to provide a firm seating surface, it is possible that the bladder 30 will partially distend into the peripheral cavity 50 even when the seat 12 is unoccupied. In such cases, a spring mechanism (not shown) can be disposed between the upper and lower mats 32, 34 to bias the mats 32, 34 apart so that the bladder 30 only distends into the peripheral cavity 50 when the seat 12 is occupied.

Figure 3:
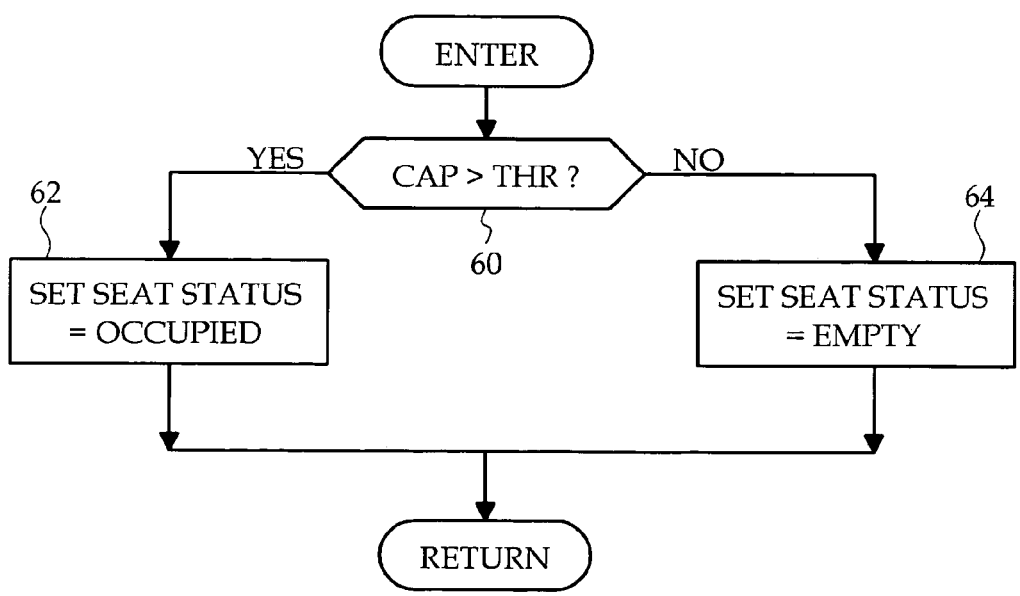
FIG. 3 depicts a flow diagram representative of a software routine executed by the electronic controller of FIGS. 1A and 1B according to this invention.

FIG. 3 is a simplified flow diagram representative of a software routine executed by the electronic controller 42 for interpreting the measured capacitance and producing a corresponding occupant presence output on line 52. The illustrated routine may be periodically executed during vehicle operation, or on detection of a change in vehicle conditions that might accompany a change in occupant status. Referring to FIG. 3, the block 60 compares the measured capacitance CAP with the threshold THR. If CAP exceeds THR, the block 62 is executed to produce an indication on line 52 that the seat 12 is occupied; otherwise, the block 64 is executed to produce an indication on line 52 that the seat 12 is empty.

In summary, the apparatus of the present invention provides an easily calibrated and cost effective way of detecting occupant presence. While the apparatus has been described in reference to the illustrated embodiment, it should be understood that various modifications in addition to those mentioned above will occur to persons skilled in the art. For example, the peripheral cavity 50 may partially or fully surround the semi-rigid mat 32, the mat 32 may be formed integral with the cushion 16, the conductor plates 38, 40 may be disposed on either side of the respective upper and lower mats 32, 34, and so on. Furthermore, it should be recognized that the term capacitance as used herein is simply a way of characterizing the change in electric field coupling between the upper and lower conductor films, and any technique for measuring the change in such coupling is essentially equivalent for purposes of this invention. Accordingly, it is intended that the invention not be limited to the disclosed embodiment, but that it have the full scope permitted by the language of the following claims.

The invention claimed is:

1. Apparatus for detecting the presence of an occupant on a seat, the apparatus comprising:
    a fluid-filled elastomeric seat bladder disposed in said seat;
    an upper conductor film disposed on or near an upper surface of said bladder, and a lower conductor film disposed substantially parallel to said upper conductor film on or near a lower surface of said bladder;
    a semi-rigid mat disposed in proximity to the upper surface of said bladder, and having a peripheral recess at least partially surrounding said upper conductor film, such that when occupant weight is applied to said seat, a portion of said bladder distends into said recess to decrease a distance between said upper and lower conductor films; and
    a controller for determining occupant presence based on a detected change in capacitance or electric field coupling between said upper and lower conductor films due to the decrease in distance between said upper and lower conductor films.

2. The apparatus of claim 1, wherein said upper conductor film is disposed on said semi-rigid mat.

3. The apparatus of claim 1, comprising:
    a second mat disposed in proximity to the lower surface of said bladder, said lower conductive film being disposed on said second mat.

4. The method of claim 1, wherein said controller includes a calibrated threshold and means for comparing a measure of the capacitance between said upper and lower conductor films to said threshold to determine occupant presence.

5. The apparatus of claim 1, comprising:
    means for biasing said semi-rigid mat away from said bladder to prevent said bladder from distending into said recess when no occupant weight is applied to said seat.

6. The apparatus of claim 1, wherein said semi-rigid mat is disposed between said bladder and a cushion of said seat.

* * * * *